US011100494B2

United States Patent
Correa et al.

(10) Patent No.: US 11,100,494 B2
(45) Date of Patent: Aug. 24, 2021

(54) PORTABLE SYSTEM FOR UPDATING TRANSACTION INFORMATION ON CONTACTLESS CHIPS

(71) Applicant: RPC Rede Ponto Certo Technologia E Serviços Ltda., São Paulo (BR)

(72) Inventors: Marcelo Correa, São Paulo (BR); Wellington De Souza, São Paulo (BR); Amauri Da Silva, Jr., São Paulo (BR)

(73) Assignee: RPC REDE PONTO CERTO TECNOLOGIA E SERVIÇOS LTDA, São Paulo (BR)

( * ) Notice: Subject to any disclaimer, the term of this patent is extended or adjusted under 35 U.S.C. 154(b) by 190 days.

(21) Appl. No.: 16/311,648

(22) PCT Filed: Jun. 30, 2017

(86) PCT No.: PCT/BR2017/050171
§ 371 (c)(1),
(2) Date: Dec. 19, 2018

(87) PCT Pub. No.: WO2018/006147
PCT Pub. Date: Jan. 11, 2018

(65) Prior Publication Data
US 2019/0333049 A1  Oct. 31, 2019

(51) Int. Cl.
*G06Q 20/36* (2012.01)
*G06Q 20/10* (2012.01)
(Continued)

(52) U.S. Cl.
CPC ......... *G06Q 20/3672* (2013.01); *G06Q 20/10* (2013.01); *G06Q 20/32* (2013.01); *G06Q 20/34* (2013.01)

(58) Field of Classification Search
CPC .............. G06F 3/041; G06Q 20/3274; G06Q 20/3276; G06Q 20/3829; G06Q 20/401;
(Continued)

(56) References Cited

U.S. PATENT DOCUMENTS

| 7,729,986 B1 * | 6/2010 | Hoffman | G06Q 20/341 |
| | | | 705/41 |
| 2003/0172272 A1 * | 9/2003 | Ehlers | H04L 63/18 |
| | | | 713/170 |

(Continued)

FOREIGN PATENT DOCUMENTS

WO  2016076812 A1  5/2016

OTHER PUBLICATIONS

International Search Report for International Application No. PCT/BR2017/050171, dated Sep. 20, 2017, 2 pages.

(Continued)

*Primary Examiner* — Scott S Trotter
*Assistant Examiner* — Slade E Smith
(74) *Attorney, Agent, or Firm* — Troutman Pepper Hamilton Sanders LLP; Ryan Schneider; Korbin Blunck

(57) ABSTRACT

A mobile system for transitional updating of information in contactless chips, wherein allowing the chip users to perform transactional operations when in transit, using a smartphone, tablet, notebook, smartwatch or any other device capable of run mobile applications, U includes a user request via mobile application; authentication on a network server; and authentication with an issuer key. It is an alternative for contactless chips users to perform transactional operations while in transit using a smartphone, tablet or any other device capable of running mobile applications. It allows the user complete autonomy in the process of updating or consulting the contents of their chip, eliminating their dependence on the network of fixed terminals.

8 Claims, 1 Drawing Sheet

(51) Int. Cl.
*G06Q 20/32* (2012.01)
*G06Q 20/34* (2012.01)

(58) Field of Classification Search
CPC ............... G06Q 2220/00; G06Q 30/02; G06Q 30/0209; G06Q 30/0273; G06Q 20/10; G06Q 20/28; G06Q 20/32; G06Q 20/34; G06Q 20/349; G06Q 20/353; G06Q 20/3672; G10L 13/02; G10L 15/20; H04L 65/1006
USPC .......................................................... 705/41
See application file for complete search history.

(56) References Cited

U.S. PATENT DOCUMENTS

| | | | | |
|---|---|---|---|---|
| 2004/0127256 | A1* | 7/2004 | Goldthwaite | G06Q 20/02 455/558 |
| 2005/0189415 | A1* | 9/2005 | Fano | G06N 99/00 235/383 |
| 2006/0020479 | A1* | 1/2006 | Rivers | G06Q 40/02 455/414.1 |
| 2006/0029194 | A1* | 2/2006 | Hurd | G06Q 10/107 379/88.13 |
| 2006/0098097 | A1* | 5/2006 | Wach | G02B 27/0025 348/207.99 |
| 2006/0116167 | A1* | 6/2006 | Raviv | H04M 1/72406 455/558 |
| 2006/0224901 | A1* | 10/2006 | Lowe | G06F 21/45 713/186 |
| 2007/0106892 | A1* | 5/2007 | Engberg | H04L 69/329 713/168 |
| 2009/0132813 | A1* | 5/2009 | Schibuk | G06Q 20/322 713/158 |
| 2009/0198618 | A1* | 8/2009 | Chan | G06Q 20/02 705/66 |
| 2011/0202466 | A1* | 8/2011 | Carter | G06Q 20/3224 705/67 |
| 2013/0139230 | A1* | 5/2013 | Koh | G06Q 20/352 726/5 |
| 2013/0151400 | A1* | 6/2013 | Makhotin | G06Q 20/32 705/39 |
| 2013/0203444 | A1* | 8/2013 | Perry | C08G 18/4288 455/456.3 |
| 2014/0006194 | A1* | 1/2014 | Xie | G06Q 20/326 705/21 |
| 2014/0074637 | A1* | 3/2014 | Hammad | G06Q 20/3227 705/21 |
| 2014/0279558 | A1* | 9/2014 | Kadi | G06Q 20/322 705/71 |
| 2014/0308934 | A1* | 10/2014 | Fisher | G06Q 30/0238 455/414.1 |
| 2014/0344153 | A1* | 11/2014 | Raj | G06Q 20/3821 705/44 |
| 2015/0006378 | A1* | 1/2015 | Blythe | G06K 19/0716 705/41 |
| 2015/0019443 | A1* | 1/2015 | Sheets | G06Q 20/3829 705/71 |
| 2015/0052064 | A1* | 2/2015 | Karpenko | G06Q 20/3829 705/71 |
| 2015/0077228 | A1* | 3/2015 | Dua | G06Q 20/3674 340/5.81 |
| 2015/0088756 | A1* | 3/2015 | Makhotin | G06Q 20/32 705/71 |
| 2015/0106456 | A1* | 4/2015 | van Hoek | H04L 67/14 709/206 |
| 2015/0142667 | A1* | 5/2015 | Landrok | G06Q 20/326 705/67 |
| 2015/0262164 | A1* | 9/2015 | Ranganathan | G06Q 20/322 705/39 |
| 2015/0332247 | A1* | 11/2015 | Winfield | G06Q 20/349 705/41 |
| 2016/0042207 | A1* | 2/2016 | Inotay | H04W 4/80 340/5.8 |
| 2016/0057619 | A1* | 2/2016 | Lopez | G06F 9/455 380/247 |
| 2016/0065370 | A1* | 3/2016 | Le Saint | H04L 9/0841 713/155 |
| 2016/0191236 | A1* | 6/2016 | Smirnoff | H04L 63/062 713/171 |
| 2016/0248479 | A1* | 8/2016 | Bellenger | H04B 5/0031 |
| 2016/0275504 | A1* | 9/2016 | Koh | G06Q 20/3672 |
| 2016/0379101 | A1* | 12/2016 | Hammad | G07F 7/10 235/380 |
| 2017/0243197 | A1* | 8/2017 | Salvador | G06Q 20/322 |
| 2017/0364911 | A1* | 12/2017 | Landrok | H04L 9/3228 |
| 2020/0067897 | A1* | 2/2020 | Smirnoff | H04L 9/0897 |

OTHER PUBLICATIONS

Written Opinion for International Application No. PCT/BR2017/050171, dated Sep. 20, 2017, 5 pages.

* cited by examiner

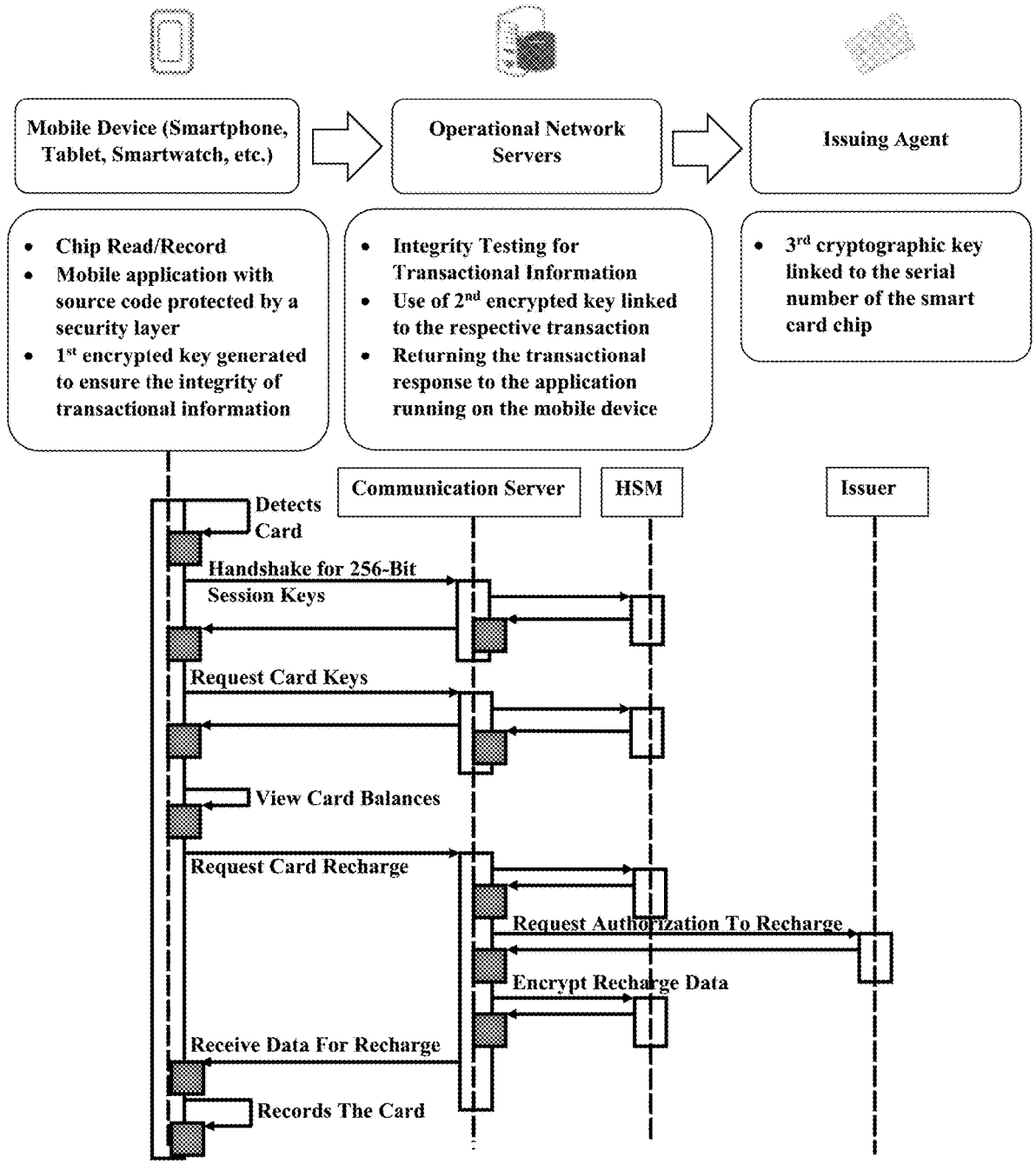

PORTABLE SYSTEM FOR UPDATING TRANSACTION INFORMATION ON CONTACTLESS CHIPS

FIELD OF INVENTION

The present invention relates to a method and its technological system employed for the purpose of promoting reading or recording on chips used among various purposes as means of payment through mobile devices such as smartphones, tablets, notebooks, smartwatches or others that may replace them.

BACKGROUND OF THE INVENTION

The state of the art contemplates chip cards capable of being read and/or recorded by information readers/recorders, enabling multiple applications such as creation of access cards, identification, means of payment, etc. The chips can be read by sales terminals allowing the purchase of products or services without having an online data connection, as in the case of credit or debit cards. This enables the distribution of multiple point-of-sale terminals without the need for physical data connections, significantly reducing the cost per point of sale maintenance.

One of the main drawbacks present in the prior art relates to the dependence of users on the network of fixed terminals. Thus, when a user is in transit and needs to make a payment without having enough balance in his card, he will be unable to use his chip as payment method until he finds a specific terminal to recharge his credits.

One of the objects of the present invention is to provide an alternative for contactless chip users to perform transactional operations when in transit using a smartphone, tablet or any other device capable of running applications furniture. This will allow the user complete autonomy in the process of updating or consulting the contents of their chip, eliminating their dependence on the network of fixed terminals.

Another object of the present invention is to provide a secure solution for data traffic between the user's mobile device and authentication network of purchase transactions, in accordance with good data encryption security practices by combining multiple cryptographic keys to ensure the integrity of the information and mitigate the risks of fraud.

Therefore, in order to allow the best possible clarification of the object in question, a description will be given with reference to the following FIGURE, where:

FIG. 1 illustrates a flow chart with the steps of the transactional process of updating and authenticating information between the contactless type chip and the operational network server;

Accordingly, as shown in FIG. 1 above, the mobile system for transitional updating of information in contactless chips, object of this patent of invention, consists of a process composed of three macro steps, namely:

User request via mobile application;
Authentication on Operational Network Server;
Authentication with the Issuer key;

The transactional process starts with a request from the user through the mobile application for query or information recording. Approaching the chip and the mobile device, the information on that chip is read by the application and the transaction requested by the user is then processed and encrypted for remote transfer. The transactional information is then transferred and interpreted by the operational server using a second key that encrypts the chip read/write keys owned by the respective sending agent. The server then returns the transactional information to the application executed by the user's mobile device and updates the information on the chip, completing the transactional operation.

It's been addressed in this Specification of a new design for the "MOBILE SYSTEM FOR TRANSITIONAL UPDATING OF INFORMATION IN CONTACTLESS CHIPS", presenting, as can be evidenced by the description and FIGURES presented, some advantages and differentiated applications with respect to the existing conventional methods.

Having thus been described and illustrated the best presently contemplated embodiment for the accomplishment of the present invention, numerous modifications and variations in its embodiment may be readily introduced by those skilled in the art. However, it is understood that the present invention is not limited to the practical aspects illustrated and described in this report, encompassing within its scope all obvious variations and modifications which may not be described.

For the advantages it offers and still because it has truly innovative technical characteristics, it fulfills all the requirements of originality and novelty in the field, meeting the necessary conditions to obtain an Invention patent.

The invention claimed is:

1. A method for transitional updating of information in a chip of a mobile device using an operational network server comprising:
    receiving a request by a user through a mobile application running on the mobile device for a transactional operation;
    reading information from the chip in response to the request from the mobile application;
    encrypting transactional information read from the chip;
    transferring the encrypted transactional information remotely to the operational network server;
    performing an authentication on the operational network server;
    performing an authentication with a first issuer key; and
    updating information on the chip based upon a transactional response from the operational network server;
    wherein the mobile application is composed of a source code protected by a security layer to avoid reading by unauthorized third-parties.

2. The method according to claim 1 further comprising using multiple cryptographic keys together along the authentication steps.

3. The method according to claim 2 further comprising ensuring the integrity of the transactional information transferred remotely with a cryptographic model, reducing the possibility of fraud.

4. The method according to claim 2 further comprising using a second key that encrypts read and write keys associated with a serial number of the chip.

5. The method according to claim 3, wherein the cryptographic model reduces the possibility of fraud by insertion of a fraudulent agent between the mobile application and the server of the operational network.

6. The method according to claim 4, wherein the transactional information is transferred and interpreted by the operational network server using the second key; and
    wherein the serial number is provided by a sending agent.

7. A method for transitional updating of information in a chip of a mobile device using an operational network server comprising:

receiving a request by a user through a mobile application running on the mobile device for a transactional operation;

reading information from the chip in response to the request from the mobile application;

generating a first encrypted key to ensure the integrity of transactional information read from the chip;

encrypting the transactional information for remote transfer;

transferring the encrypted transactional information remotely to the operational network server;

by the operational network server, integrity testing for the transactional information;

by the operational network server, performing an authentication with an issuer key of an issuing agent;

by the operational network server, using a second encrypted key linked to the transaction to encrypt read and write keys associated with a chip serial number of the chip and provided by the issuing agent;

by the operational network server, determining a transactional response;

returning the transactional response to the mobile application running on the mobile device by the operational network server; and updating information on the chip based upon the transactional response from the operational network server;

wherein the mobile application comprises a source code protected by a security layer to avoid reading by unauthorized technicians or potential fraudsters.

8. The method of claim 7, wherein integrity testing for the transactional information comprises using a cryptographic model, reducing the possibility of fraud by insertion of a fraudulent agent between the mobile application and the operational network server.

* * * * *